United States Patent [19]

Rasekhi et al.

[11] 4,381,966
[45] May 3, 1983

[54] PROCESS FOR FABRICATING RECORDING HEADS FOR MAGNETOGRAPHY

[75] Inventors: Houshang Rasekhi, Convent Station, N.J.; Alfred M. Nelson, Redondo Beach, Calif.

[73] Assignee: Wang Laboratories, Inc., Lowell, Mass.

[21] Appl. No.: 297,610

[22] Filed: Aug. 31, 1981

[51] Int. Cl.³ .............................................. C23F 1/02
[52] U.S. Cl. .................................. 156/630; 156/634; 156/652; 156/656; 156/661.1; 360/122; 430/312; 430/316; 430/318
[58] Field of Search ............... 360/110, 122, 125, 126, 360/127; 29/603, 604, 609; 156/629–634, 656, 659.1, 661.1, 650–652; 430/312, 313, 316, 318, 323, 329

[56] References Cited

U.S. PATENT DOCUMENTS 3,801,388  4/1974  Akiyama et al. .................... 156/630

OTHER PUBLICATIONS

IBM Technical Disclosure Bulletin, vol. 16, No. 5, Oct. 1973, Two–Side Etching for Thick Films by A. W. Cummins et al., pp. 1604–1605.

Primary Examiner—William A. Powell
Attorney, Agent, or Firm—Michael H. Shanahan; Joseph E. Funk

[57] ABSTRACT

A method of fabricating from a single piece of copper foil the extremely fragile recording element structure of a multi-channel magnetic recording head having a linear array of bi-metal recording elements, in which the elements are comprised of elongated substantially parallel finger portions terminating in a common return, with each having a minutely thinned down recording zone. For high resolution recording head structures, the dimensions of the elements at the recording zone may typically be as thin as $0.1 \times 10^{-3}$ inches with a width of $1.5 \times 10^{-3}$ inches and length of $3.5 \times 10^{-3}$ inches, where the total length of the recording elements may nevertheless be as long as three inches. The process comprises an etching technique and the application of one or more supports at appropriate times in the fabrication to protect the structure at its most vulnerable times. Full masking and deposition of bi-metal layer areas is accomplished prior to any etching steps to avoid, for example, having to re-register the recording element design on one side of the copper foil relative to the other.

25 Claims, 10 Drawing Figures

PROCESS FOR FABRICATING RECORDING HEADS FOR MAGNETOGRAPHY

BACKGROUND OF THE INVENTION

This invention relates to improvements in fabrication processes for making magnetographic recording heads.

The commercial production of recording heads for high resolution magnetography (i.e., >100 lines per inch) for commercial applications such as printing, requires fabrication techniques and processes that can provide consistantly and economically reliable yields.

More specifically, a recording head structure such as that described in U.S. Pat. No. 4,025,927 to Nelson requires the formation of very fine recording elements arranged in an array with spacings as small as $3-4 \times 10^{-3}$ inch. As described therein, the recording of minute magnetic zones or pixels on a magnetic recording medium is accomplished through the geometric "thinning down" of each of the recording elements at their respective recording zones. Hence, the "center" of the recording current is directed toward and thus closer to the magnetic medium at the recording zone, resulting in a more intimate interaction between the magnetic field of the recording current and the magnetic medium.

In such a recording head structure the many individual closely spaced apart recording elements have dimensions on the order of $1.5-4 \times 10^{-3}$ in. wide and $0.1-0.5 \times 10^{-3}$ in. thick (at the recording zone), and yet are 0.5-3 inches long.

It is appropriate to employ the so-called bi-metal etch foil technology to fabricate such recording heads. In such a technique, each side of a sheet of copper foil may be coated with a photoresist material and optically exposed to a designed pattern corresponding at least in part to the intended arrangement of conductive recording elements. Subsequently, the exposed photoresist is removed (for a positive photoresist or vice versa for a negative photoresist) and the foil then subjected to a nickel plating process step that results in the deposition of say $0.1-0.5 \times 10^{-3}$ in. thick nickel on the bared copper surfaces of at least one of the sides of the foil. At this point both sides of the copper foil are entirely coated with either photoresist or nickel, neither of which is affected by the etching solutions utilized to dissolve away the copper.

Essentially, the front and rear patterns are designed such that each recording element is sandwiched in between nickel and/or photoresist coatings. As the elements extend away from the recording zone, there size can increase and the elements can thus be arranged to fan-out. At the recording zone the coating of say the back side (i.e., nickel or any other back-side suitable coating/filling material used, such as photoresist material) only is discontinued for a predetermined length i.e., on the order of $3-8 \times 10^{-3}$ inches. Removal of the underlying copper at the recording zone creates an indentation in each of the recording elements constituting the thinning of the recording element down to the $0.1-0.5 \times 10^{-3}$ inch thick nickel layer on the front side. Thus, this removal of the copper at the recording zone effectively divides the copper foil into two parts. The two portions are, therefore, held together essentially only by the very thin and delicate unsupported nickel elements. This construction, i.e., the relatively immense areas of copper foil on either side of the very thin nickel bridges holding these masses of copper together, is extremely fragile and as a result impractical with regard to customary process steps and handling procedures.

Therefore, what is needed is an improved fabrication process that would permit reliable and relatively inexpensive production of such recording heads at substantially higher production yields.

SUMMARY OF THE INVENTION

In accordance with the present invention the above problems are solved by a process for fabricating a recording head structure of the aforementioned type, in which the multilayer (bi-metal) foil piece, comprised of relatively thin copper foil (e.g., 1-1.5 mil thick) is processed through all of a two-sided, fully-registered series of masking and deposition steps prior to any etching and then a limited amount of etching from one side only to a stage where the structure still retains sufficient physical (and mechanical) strength so that it can be handled further. At this point the partially etched side of the multilayer sheet or foil structure is bonded at least partially (i.e., at least at its most vulnerable areas) to a permanent solid substrate that is also resistant to the etching solutions. Thereafter the remainder of the etching process is safely undertaken from the front (available) side of the foil in obtaining the finished product.

According to the broader aspects of the invention there is thus provided a method of fabricating from a single piece of foil-thickness, highly conductive first material the recording element structure of a multi-channel magnetic recording head having a linear array of recording elements, which elements are comprised of elongated substantially parallel conductive finger portions terminating in a common return, with each having a minutely thinned down recording zone, comprising: temporarily selectively masking both major sides of the first material in registration with one another and depositing a thin layer of conductive second material onto the areas of a first of said major sides of the first material exposed by said masking and a thin layer of a suitable filler third material onto the areas of the second of said major sides of the first material exposed by said masking; etching the exposed areas of said first material on the second side thereof such that the first material between the recording elements at the respective recording zones is completely etched through its thickness; permanently securing the recording element structure at least in the vicinity of the recording zones to a support with a non-conductive adhesive fourth material, said adhesive fourth material filling the etched areas of said first material in the vicinity of the recording zones; and etching the first material between the finger portions.

By this etching process, it can be seen that only so much of the work is accomplished on the relatively thin foil structure from the one side as is reasonably possible without so weakening the structure as to make handling and further processing impractical. Then the structure is secured to a permanent structurally sound ("hard") substrate in such a way that the etching process can be expediously completed from the other side.

A very important feature of the process according to the invention is that all of the masking on both sides of the structure, fully registered one to the other, is completed before any etching of the foil piece is done. In this way the nickel depositions (front and/or back) defining the actual recording elements are also fully in place prior to any etching of the copper foil. As a result the potential problems of having to re-register the mask(s) associated to the one side relative to the other, which re-registration likely would otherwise be required due to the induced mechanical stresses residing in the copper foil manifesting following even an initial partial etch, are completely avoided. The problems associated with re-registration could become critical particularly when one considers that for the contemplated structure, the elongated substantially parallel stripes constituting the recording elements, as defined on the one side of the foil, must align or register with the stripes defined on the other side to a fraction of a mil (e.g., 1/10 of a mil) for proper construction.

In yet another area of advantage provided by this invention, the adhesive binder, e.g., an epoxy, securing the partially etched structure to its permanent mandrel or substrate, readily fills the holes in the copper created adjacent to the recording zones of the recording elements, thus assuring that the extremely fragile nickel bridges of the recording zones will not be able to bend or distort in subsequent handling. Without this additional feature the nickel bridges might still be able to bend inward toward the substrate or buckle outward, even though the structure is otherwise secured.

BRIEF DESCRIPTION OF THE DRAWINGS

The above-mentioned and other objects, features and advantages of the present invention will become better understood from the following detailed description taken in conjunction with the accompanying drawings, in which:

FIG. 1 illustrates the copper foil piece upon which a blanket coat of photoresist material applied to both sides has been masked and photoexposed, with the exposed areas removed;

FIG. 2 illustrates the work piece of FIG. 1 with nickel deposited on the exposed areas of the copper;

FIG. 3 illustrates the work piece of FIG. 2 with the photoresist material associated to the recording zone area being removed on the back side and the exposed copper etched through its thickness;

FIG. 4 illustrates the work piece of FIG. 3 bonded to a permanent solid mandrel via adhesive which fills the back side etchings and recesses;

FIG. 5 illustrates the completed work piece and in particular the work piece of FIG. 4 with the front side photoresist removed and the etching of the copper completed;

FIG. 6 illustrates the work piece of FIG. 2 with the photoresist material associated to the recording zone area removed on the back side of the exposed copper etched halfway through its thickness;

FIG. 7 illustrates the work piece of FIG. 6 with the remaining back side photoresist being exposed and removed and the exposed copper being etched to completion at the recording zone area and halfway through its thickness in the fingers region of the recording elements;

FIG. 8 illustrates the work piece of FIG. 7 bonded to a permanent solid mandrel via adhesive which fills the back side etchings;

FIG. 9 illustrates the work piece of FIG. 8 with the front side photoresist removed and the etching of the copper completed.

DESCRIPTION OF THE PREFERRED EMBODIMENT(S)

In accordance with the invention, fabrication of the write element portion of a recording head structure of the type such as that described in the aforementioned Nelson patent begins with a sheet of copper foil. In FIGS. 1 through 5 the thickness of this foil is exaggerated somewhat for ease of illustration. For the purposes of the embodiments initially described hereinafter, it is intended that the copper foil be relatively thin (i.e., 1–1.5 mils thick). A suitable photoresist material, such as the Shipley product AZ 111, is applied in customary manner to both sides of the copper sheet either simultaneously or sequentially, to a thickness of say 0.1–0.5 mils. One way of obtaining a substantially uniform layer is to apply two coats of photoresist material via the so-called withdrawal method, with the second coat being applied in the opposite direction.

Figure 1:
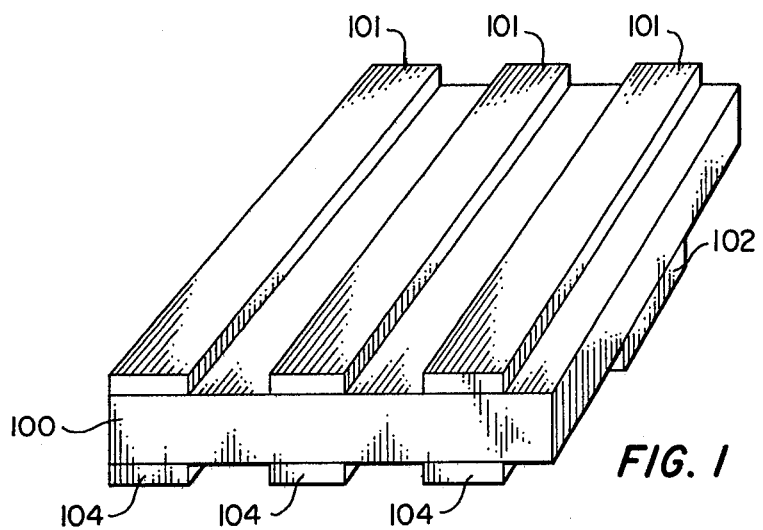
FIGS. 1 through 5 illustrate in perspective views a representative portion of the work product in various stages of progress in the fabrication process according to the present invention, wherein, in particular.

The photoresist layers are exposed to light patterns via suitably designed substantially matching masks, suitably registered or aligned relative to each other. The exposed photoresist areas are then removed (in the case of a positive photoresist material) either simultaneously or sequentially by conventional technique, leaving the construction as illustrated in FIG. 1. It will be appreciated that a negative photoresist material could just as easily be employed.

In FIG. 1 a portion of the copper foil 100 is illustrated, having thereon the remaining photoresist pattern 101 which relates to the recording elements (as indicated below) from the one side and the remaining pattern relating to the recording elements comprising areas 102 and 104 on the other or back side. Photoresist areas 101 and 104 are opposite one another and define the separations between the actual recording elements and leads to the definition of the fingers portion of the recording elements. Photoresist area 102 runs across the copper foil 100 (perpendicular to the recording elements) and leads to the definition of the recording zones of the recording elements, and in actuality leads to the discontinuity of nickel or other suitable material deposited on the back side of the foil at the recording zone in a subsequent step, as will become more apparent below.

Figure 2:
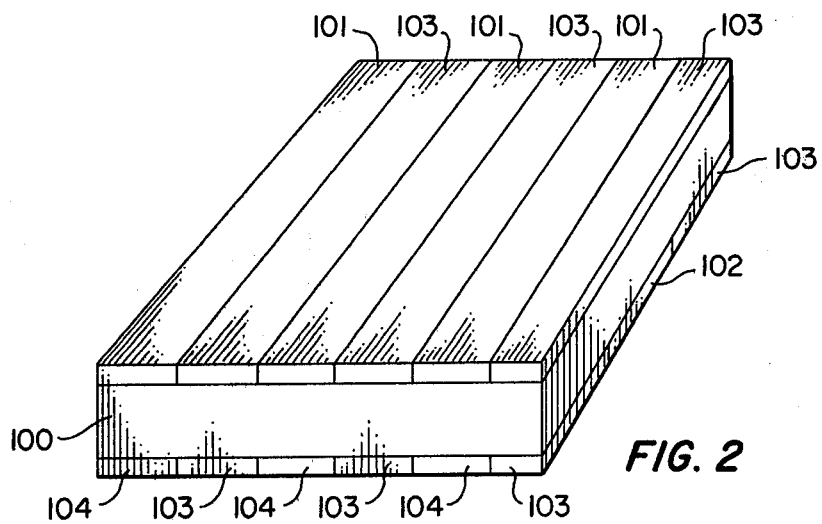

The arrangement of FIG. 1 is subjected to a nickel deposition technique on both sides, either simultaneously or sequentially. FIG. 2 shows the copper foil 100 after receiving the process of nickel plating. As depicted, nickel 103 becomes deposited on the bare copper surfaces. In accordance with the invention, the nickel deposition on the rear surface (i.e., the surface containing the deposit of photoresist layer 102) can be substituted by the deposition of any other suitable material covering the recording elements in the so-called fingers region, which, like nickel, is resistant to the etching solution(s) employed in this process and, like nickel also, has sufficient body and strength to remain intact even in the face of external forces applied to the structure.

At this stage the front side of the foil comprising the alternate sections or stripes of photoresist 101 and nickel 103, particularly in the recording zone area, can be temporarily secured or bonded to a supporting substrate (e.g., adhesive or siliconized tape, wax or even dry photoresist or a magnetizable sheet) which will be removed near the end of the process. This temporary supporting substrate reinforces the nickel elements particularly at the recording zone, thus preventing possible physical damage to the nickel elements. The need for additional support and reinforcement becomes greater as the record head becomes wider (i.e., the greater the number of recording elements desired). However, for relatively narrow (i.e., less than forty recording elements) recording heads, such support is optional. For the narrower heads particularly, the addition of two relatively wide stripes or pieces of copper foil to the extreme sides or ends of the recording elements (see FIG. 10, elements 150) constitutes an alternative approach which should be adequate for the mechanical support of the recording zone area. The stresses and forces that lead to the accidental bending of the foil will be almost entirely supported by these side pieces of the foil.

For relatively thin copper foil (i.e., 1–1.5 mils thick) particularly, the steps associated with FIGS. 1 and 2 in connection with the so-called back side of the foil, i.e., that side having the photoresist pattern 102, 104, could be largely eliminated in connection with an alternative embodiment of the process according to the invention. Instead, a solid coating of unexposed photoresist simply could be allowed to remain on the back side during the nickel deposition on the front side, in cases where the masking nickel stripes on the back side are not desired.

The process continues in either approach with the rear side recording zone area (in the case of FIG. 2, the slit defined by photoresist pattern 102) only being subjected to light such that this photoresist area is fully exposed, and thereafter removed.

Figure 3:
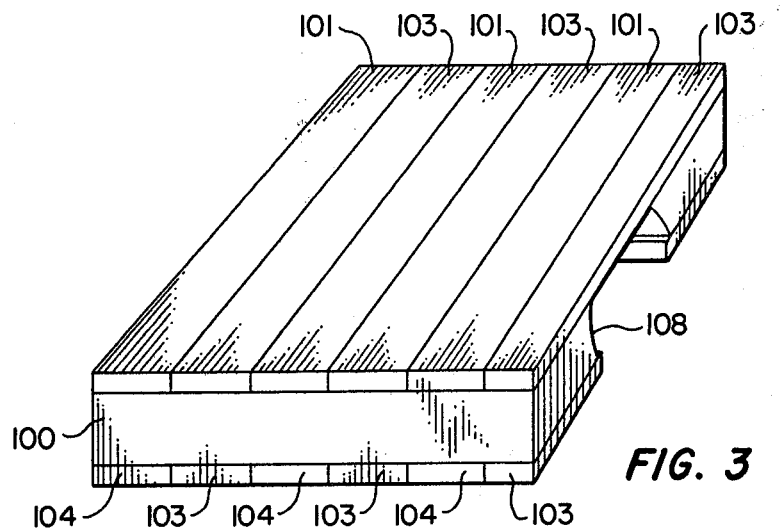

FIG. 3 depicts the structure following removal of the photoresist area 102 from the rear side of the copper foil 100 at the recording zone areas and thereafter etching the recording zone area entirely through with a suitable copper etchant such as hot ferric chloride. Also, although not particularly shown in FIGS. 1 through 9, the outline etch required to define the overall shape of the work piece from the main body of copper foil 100 (or 153) is effected at the same time and in the same way as the recording zone area etch (see FIG. 10 at 151), except for tabs 152.

Thus, FIG. 3 shows the resulting configuration of the recording zone area in the form of a completed groove 108. As illustrated, the groove 108 divides the copper foil 100 into two parts which are held together now essentially only by the nickel bridges 103 on the top surface. Under this condition, the assembly is very vulnerable to mechanical bending and stresses at the recording zone. However, as mentioned earlier, the addition of the temporary support (not particularly shown) to the front surface substantially reduces the probability of damage to the recording zone during subsequent process steps.

To more permanently support the recording zone and prevent damage or alteration of the recording head pattern, the foil configuration as shown in FIG. 3 is bonded permanently to a mandrel or substrate 106 (FIG. 4), preferably of oxidized or anodized aluminum, with a suitable epoxy 105, such as Emerson and Cuming dycast, in a very thin layer (e.g., 1/10 mil).

A mandrel of anodized aluminum is preferred inasmuch as it has the advantageous properties of inter alia: (1) it being resistant to the etchant(s) to be used; (2) it provides a resistive surface, so the recording elements are not shorted to one another; and (3) it is a very good heat sink, thus enabling the head to readily dissipate the potentially disruptive or distructive heat that is generated at the time of recording.

The epoxy can be doped with pigment of high permeability material, such as carbonyl iron (e.g., GAF product SF8). This enables the application of substantially lower writing currents to achieve equally effective magnetic imaging on a recording medium. Moreover, this pigment should provide the epoxy with the property of greater heat conductivity.

During this process step the epoxy should be applied so that it flows into the groove 108 and bonds fully to the nickel elements 103. It is, of course, highly desirable to avoid the formation of air bubbles in the epoxy, especially in the groove 108. In the case of the above-mentioned example process for relatively thin copper foil where the back-side nickel stripes are eliminated, the remaining photoresist material on the back side preferably would be removed before securing the work piece to the permanent substrate.

At any time up to and including this point in the process, a suitable temporary support may also be applied on the front side of the foil, specifically to the finger portions of the recording element structure for additional protection. This additional temporary support could take the form inter alia of one or more magnetizable sheets.

Figure 4:
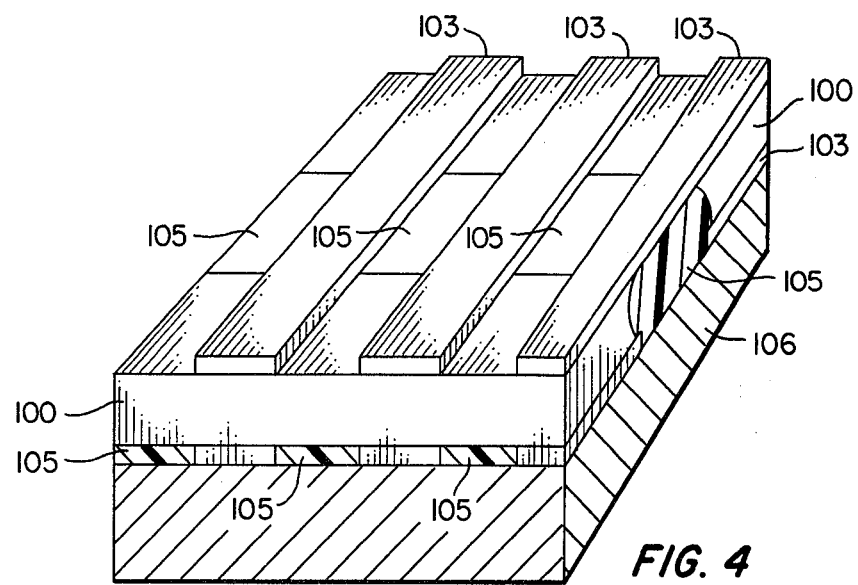
Figure 5:
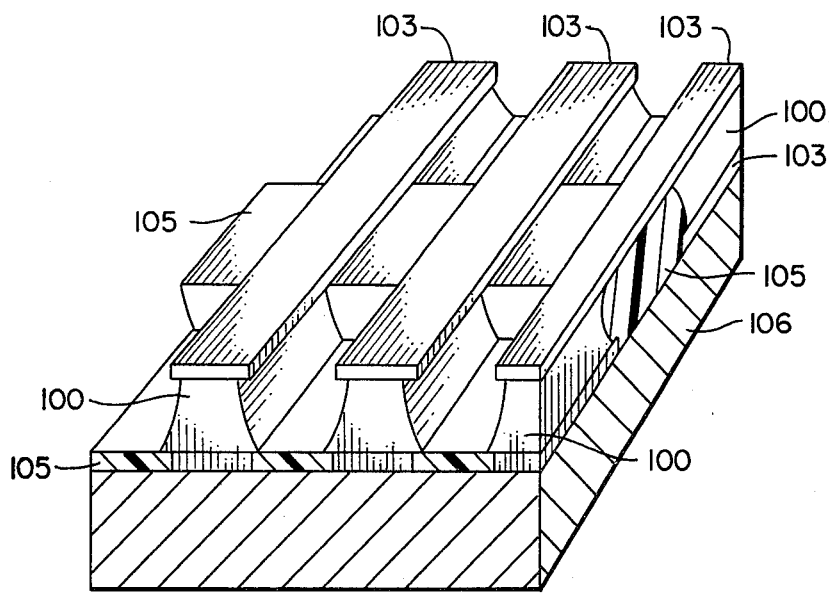

After setting and curing of the epoxy 105, thereby creating a solid and sufficiently strong structure, the temporary support(s) (if utilized) and the remaining photoresist on the front side are removed (the latter by e.g., a blanket photo-exposure or acetone wash) to prepare for the final etching step, as illustrated in FIG. 4. The final step of copper etching, i.e., from the front side, results in the complete removal of the copper in between the recording elements defined by the nickel stripes 103. FIG. 5 depicts the finished product, in which the nickel elements 103 at the recording zone are fully supported by the solid epoxy 105, as are the entirety of the recording elements comprised of the nickel/copper layers in the vicinity of the recording zones.

It is noted in FIG. 5 that the etching between the fingers provides a decreasing taper through the thickness of the copper foil, creating elements 100 with substantially trapezoidal cross-sections. It will be appreciated that it is only necessary to complete the etch to the point of providing electrical separation of the fingers. In fact, the resultant trapezoidal cross-sectional shape of the fingers provides the following operative advantage. In the operation of a recording element of the within-depicted design, it is intended that the current freely flow in the highly conductive copper fingers, whereby the centroid of current is well away from the write surface and thus would provide negligible effect in a recording medium situated at the write surface. As the current reaches the recording zone it is forced upward toward the write surface and through the thin nickel bridge. In this way the current is sufficiently close to the recording medium at the recording zone to affect the recording medium in the desired way. With the trapezoidal cross-section, the centroid of current in the finger portion tends to be even further removed from the write surface, thus providing an even greater assurance of differentiation between the fields generated in the vicinity of the write zone versus the fields away from the recording zone.

Figure 10:
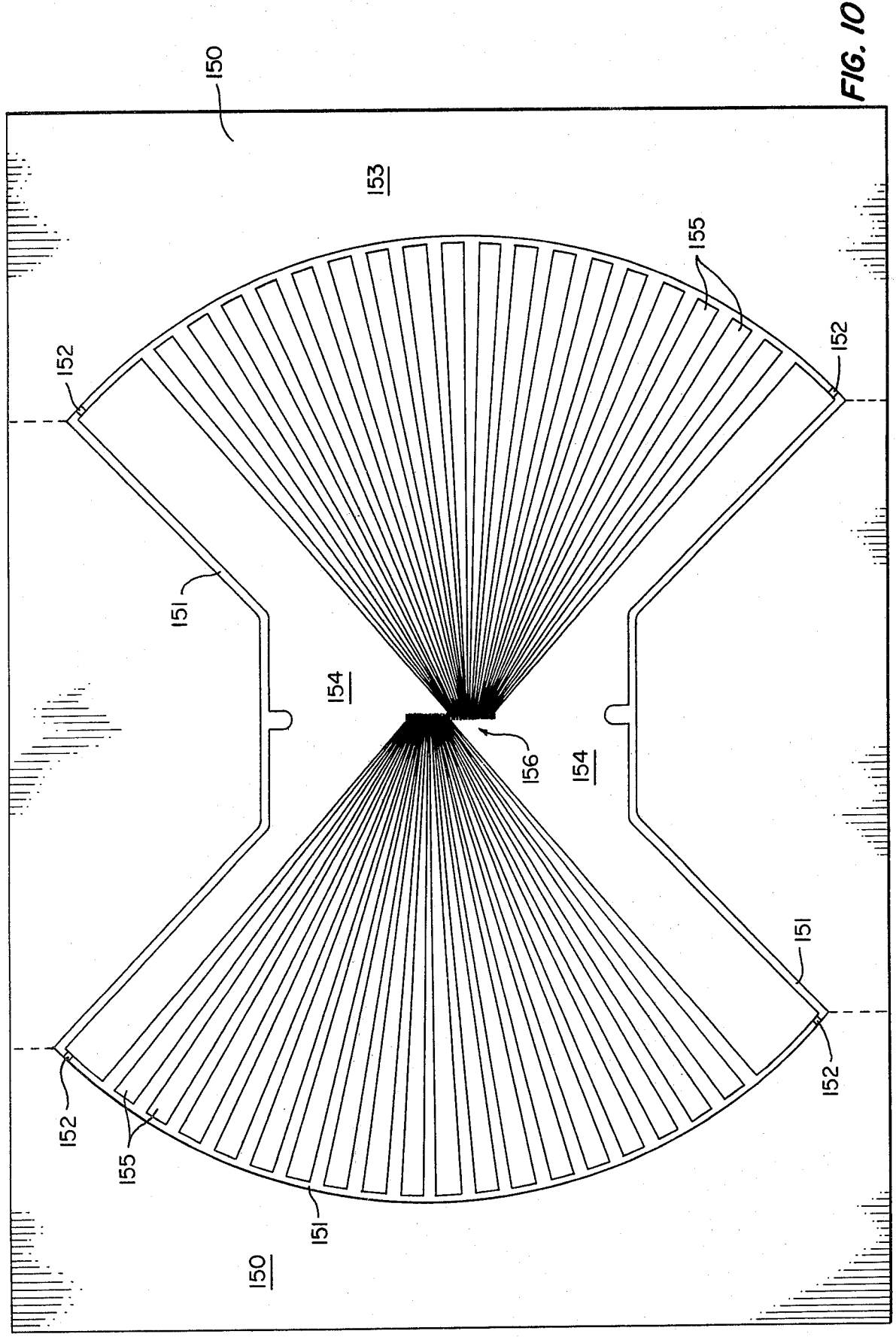
FIG. 10 is a top view of the entire recording element structure of preferred arrangment, created by either of the techniques depicted in FIGS. 1 through 9.

FIG. 10 illustrates in a top view a preferred version of recording element structure in its entirety. In this illustration it is to be noted that the following measures have been taken for ease of illustration. The permanent mandrel or other support to which the foil is normally bonded has been removed, whereas the final etched structure is nevertheless shown in its relationship with the remainder of the initial piece of copper foil. Thus, in FIG. 10 it can be seen that the finished structure is created from a single piece of copper foil 153, with the precise shape of the structure which comprises the fingers 155 and recording zones 156 of the individual recording elements, as well as the common returns 154, being defined by the outline 151. The structure following completion of the process may still be attached to the foil piece 153 to a limited extent by the tabs 152. Sections 150 on either end of the foil piece may become the hereinbefore-mentioned relatively wide pieces of copper foil adding support and handling capability to the structure.

Figure 6:
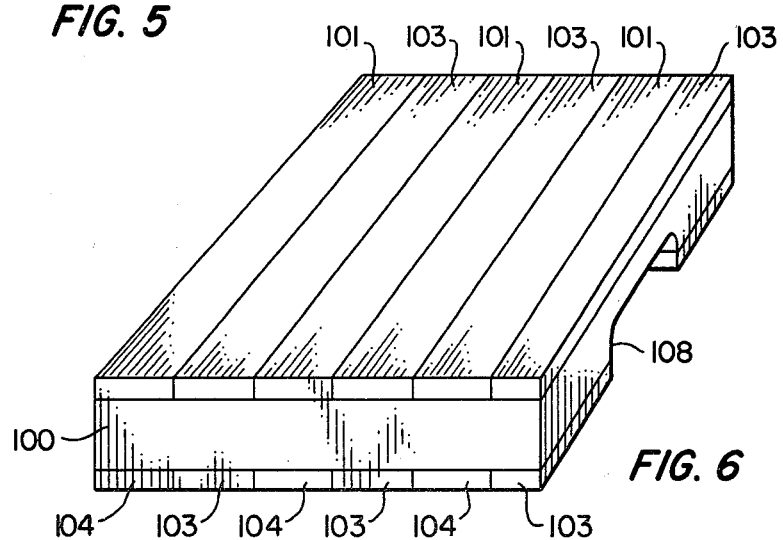
FIGS. 6 through 9 illustrate in perspective views a representative portion of the work product in various stages of progress in an alternate fabrication process, wherein in particular.

In the case where relatively thick copper foil is necessary, for example 2 mils or more thick, a somewhat modified approach is desirable. In taking the work piece as it has been processed to the point illustrated in FIG. 2 (for the case where the back-side nickel stripes are desired) the step of etching the recording zone gap or slit 108 (and the outline 151 as well) is modified to the extent that this etching is performed such that the copper foil is etched one halfway through the thickness of the copper foil 100. FIG. 6 depicts the structure following removal of the photoresist area 102 from the rear side of the copper foil 100 at the recording zone areas and thereafter etching the recording zone area halfway through with a suitable copper etchant such as hot ferric chloride.

At this stage, the rest of the rear side photoresist 104 is blanket-exposed and removed and etching of the exposed copper that is in between the recording elements is begun. The rest of the copper at the recording zone area is removed at the same time, and the outline completed as well (except for tabs 152 shown in FIG. 10).

Figure 7:
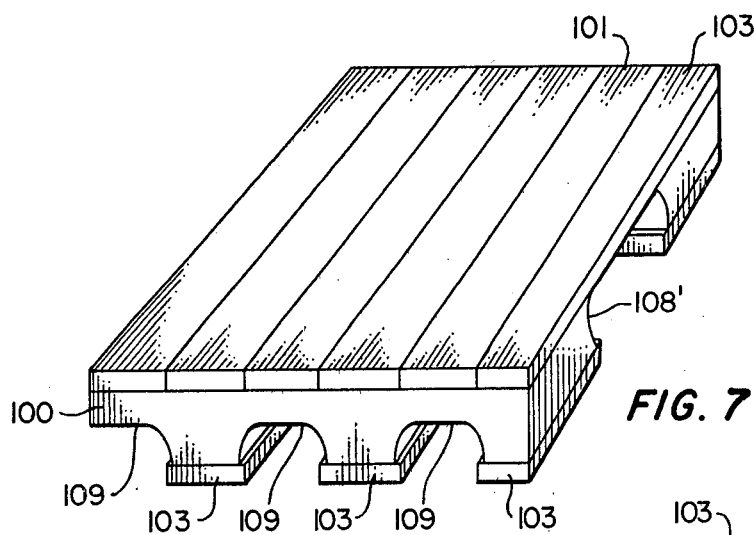

Thus, FIG. 7 shows both the resulting configuration of the recording zone area in the form of a completed groove 108' and the removal of approximately half of the copper 100 in between the recording element (at areas 109) from the back side. The foil configuration as shown in FIG. 7 is bonded permanently to the mandrel or substrate 106 (FIG. 8), as before, with a suitable epoxy 105.

Figure 8:
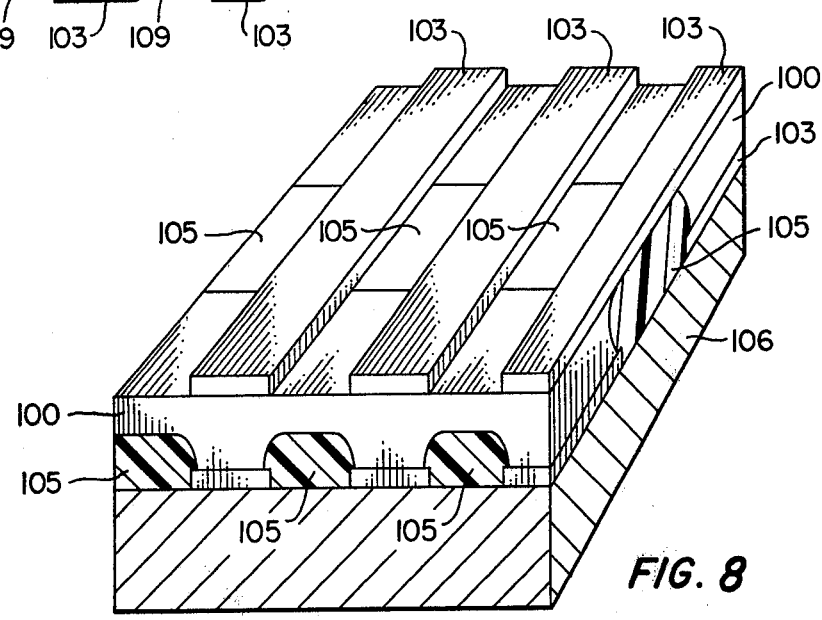

After setting and curing of the epoxy 105, the temporary support(s) (if utilized) and the remaining photoresist on the front side are removed in preparation for the final etching step, as illustrated in FIG. 8. The final step of copper etching, from the front side, results in the removal of the remaining copper in between the recording elements defined by the nickel stripes 103.

Figure 9:
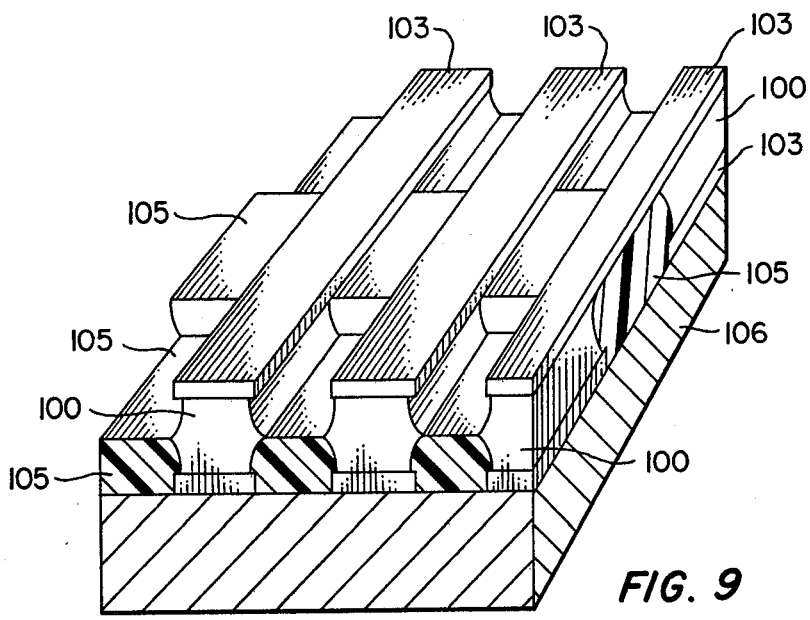

FIG. 9 thus depicts the finished work piece of this alternative approach. As shown, the nickel elements 103 at the recording zone are again fully supported by the solid epoxy 105, as are the entirety of the recording elements comprised of the nickel/copper layers in the vicinity of the recording zones.

What is claimed is:

1. A method of fabricating from a single piece of foil-thickness, conductive first material the recording element structure of a multi-channel magnetic recording head having a linear array of recording elements, which elements are comprised of elongated substantially parallel conductive finger portions terminating in a common return, with each having a minutely thinned-down recording zone, comprising:
    (a) temporarily selectively masking both major sides of the first material in registration with one another and depositing a thin layer of conductive etchant-resistant second material onto the areas of a first of said major sides of the first material exposed by said masking and a thin layer of suitable etchant-resistant third material onto the areas of the second of said major sides of the first material exposed by said masking;
    (b) etching the first material on the second side thereof such that the first material between the recording elements at the respective recording zones is completely etched through its thickness;
    (c) permanently securing the recording element structure at least in the vicinity of the recording zones to a support with an electrically non-conductive adhesive fourth material, said adhesive fourth material filling the etched areas of said first material in the vicinity of the recording zones; and
    (d) completing the etching of the first material between the finger portions.

2. A method according to claim 1 wherein said fourth material is a high permeability material and said support is composed of anodized aluminum.

3. A method according to claim 1 wherein said first material is copper, said second material is nickel and said fourth material is an epoxy.

4. A method according to claim 1 wherein said third material is the same as said second material and said third material is applied except at and in between the recording zones.

5. A method according to claim 1 wherein the step of masking comprises:
    (a) applying a blanket of photoresist material on both major sides of said first material,
    (b) selectively exposing the photoresist material on both said major surfaces, and
    (c) removing the desired portions of the photoresist material from said both sides.

6. A method according to claim 1 wherein the step of etching said first material from the second side includes the preliminary step of exposing the first material at and in between the recording zones.

7. A method according to claim 5 or 6 wherein the step of exposing the second side of the first material at and in between the recording zones includes the preliminary step of removing the photoresist material covering said first material thereat.

8. A method according to claim 1 wherein the step of completing the etching of the first material is performed from the first side thereof.

9. A method according to claim 8 wherein the step of completing the etching of the first material includes providing said finger portions with a substantially trapezoidal-shaped cross-section.

10. A method according to claim 8 wherein the step of completing the etching includes the preliminary step of removing the masking of the first side of the first material.

11. A method according to claim 10 wherein the first material is completely etched between the finger portions from said first side.

12. A method according to claim 1 wherein said third material is photoresist material and coats the second side of the first material except at and in between the recording zones.

13. A method according to claim 4 or 5 wherein the only portion of the second side of the first material exposed for etching is at and in between the recording zones.

14. A method according to claim 1 wherein the step of etching on the second side of the first material includes the step of etching substantially halfway through the first material between the finger portions.

15. A method according to claim 14 wherein the step of etching on the second side of the first material includes the step of preliminarily etching only from the areas in between the recording zones of the recording element structure substantially halfway through the thickness of the first material.

16. A method according to claim 15 wherein the step of etching on the second side of the first material further includes the subsequent step of simultaneously etching the remaining thickness of the areas of the first material in between the recording zones and the regions between the finger portions halfway through the thickness of the first material.

17. A method according to claim 15 or 16 wherein the outline of virtually the entirety of the recording element structure is etched simultaneously with and in the same manner as the areas in between the recording zones.

18. A method according to claim 1 wherein said masking step includes the steps of coating both sides of the first material with a photoresist fifth material, applying masks to both sides which are registered one to the other, exposing and removing the areas of the fifth material defining the recording elements.

19. A method according to claim 15 wherein said preliminary step includes the initial step of removing the fifth material remaining on said second side only from the recording zone areas.

20. A method according to claim 16 or 19 wherein said subsequent step includes the initial step of removing the remaining fifth material from said second side.

21. A method according to claim 1 wherein the step of completing the etching between the finger portions is performed from the first side of the first material.

22. A method according to claim 21 wherein the step of completing the etching between the finger portions includes the initial step of removing the fifth material from said first side.

23. A method according to claim 1 further including the step of applying to the said first side a suitable temporary support at least in the recording zone areas of the recording element structure prior to etching said first material.

24. A method according to claim 1 further including applying to said second side a suitable temporary support to at least the finger portions of the recording element structure not secured to the support.

25. A method according to claim 23 or 24 wherein said suitable temporary support is at least one magnetizable sheet.

* * * * *